United States Patent
Howell et al.

(10) Patent No.: US 10,197,396 B2
(45) Date of Patent: Feb. 5, 2019

(54) ALWAYS ON COMPASS CALIBRATION SYSTEM AND METHODS

(71) Applicant: Apple Inc., Cupertino, CA (US)

(72) Inventors: Adam Howell, Oakland, CA (US); Hung A. Pham, Oakland, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 15/416,768

(22) Filed: Jan. 26, 2017

(65) Prior Publication Data

US 2017/0211936 A1 Jul. 27, 2017

Related U.S. Application Data

(60) Provisional application No. 62/287,713, filed on Jan. 27, 2016.

(51) Int. Cl.
*G01C 17/38* (2006.01)
*G01C 17/02* (2006.01)

(52) U.S. Cl.
CPC ............ *G01C 17/38* (2013.01); *G01C 17/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,433,542 B2* | 8/2002 | Goldfine | ............... | G01B 7/105 324/239 |
| 6,965,505 B1* | 11/2005 | Mack | .................... | H01F 13/006 361/149 |
| 7,359,816 B2* | 4/2008 | Kumar | ................ | G01C 25/005 702/85 |
| 9,068,886 B2* | 6/2015 | Silny | ........................ | G01J 1/08 |
| 2010/0121599 A1* | 5/2010 | Boeve | .................... | G01C 17/38 702/93 |
| 2010/0298656 A1* | 11/2010 | McCombie | ............ | G16H 50/50 600/301 |
| 2012/0086438 A1* | 4/2012 | Tu | ....................... | G01R 33/0035 324/202 |
| 2012/0206129 A1* | 8/2012 | Mahan | ................... | G01C 17/38 324/202 |
| 2013/0174636 A1* | 7/2013 | Joseph | .................... | G01P 21/00 73/1.41 |
| 2013/0238268 A1* | 9/2013 | Sheng | ................ | G01R 33/0035 702/92 |

(Continued)

*Primary Examiner* — Tung X Nguyen
*Assistant Examiner* — Dominic E Hawkins
(74) *Attorney, Agent, or Firm* — DLA Piper LLP US; Kristoffer W. Lange (57) ABSTRACT

A method for performing continuous calibration of a magnetometer in a device includes during operation of a device, continually performing magnetometer measurements; continuously determining a state of the device; determining a magnetometer calibration model based on the magnetometer measurements and the state of the device; continually evaluating an accuracy of the magnetometer calibration model based the magnetometer measurements and the state of the device; and updating the magnetometer calibration model based on the evaluation of the accuracy magnetometer calibration model, the magnetometer measurements, and the state of the device.

22 Claims, 5 Drawing Sheets

(56) References Cited

U.S. PATENT DOCUMENTS

2015/0277550 A1* 10/2015 Legakis ............. H04N 5/23264
  345/156
2017/0123035 A1* 5/2017 Clark ................... G01R 35/005
2017/0336208 A1* 11/2017 Korogi .................. G01C 21/08

* cited by examiner

ALWAYS ON COMPASS CALIBRATION SYSTEM AND METHODS

CROSS-REFERENCE TO RELATED APPLICATIONS

This application claims the benefit of U.S. Provisional Application No. 62/287,713, filed on Jan. 27, 2016, titled "Always on Compass Calibration System and Methods."

This patent application is related to U.S. patent application Ser. No. 14/054,802, entitled "Compass Calibration," filed on Oct. 15, 2013 and U.S. patent application Ser. No. 14/269,677 entitled, "Magnetometer Calibration," filed on Aug. 28, 2014, the entire contents of each are hereby incorporated by reference.

BACKGROUND

A mobile device such as a cellular phone or a smart phone can now be equipped with a compass. The compass can calculate and provide its user with a direction, which may be a "heading" (typically given relative to the Earth's magnetic field), and/or an arrow pointing to true north. The direction information may be provided for the user's own navigation knowledge, for example, to tell him which way is north while he is walking or driving in unfamiliar surroundings. The direction information is also beneficial for use by a navigation or map application that may be running in the device.

A compass can obtain a measure of the magnetic field that is present in its immediate surrounding as a three-component (e.g., in x, y, and z directions) vector, using a 3-axis magnetic sensor called a magnetometer. The sensed field contains a contribution by the Earth's magnetic field, and a contribution by a local interference field. The latter is the magnetic field that is created by components in the local environment of the mobile device, and can include hard and soft iron components. Hard iron refers to magnetic materials that are difficult to magnetize, but once magnetized will retain the magnetism for long periods of time. Soft iron refers to metals that are easily magnetized, but lose their magnetic state once the magnetizing force is removed. These local magnetic effects may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

In order to account for these additional environmental magnetic fields, the magnetometer should be calibrated. Conventional magnetometer calibration procedures may require the user to maneuver the device in a defined pattern to generate data that can be used to calibrate the magnetometer. Such manual calibration procedures are required to be performed each time the magnetometer error exceeds a threshold value. Additionally, the user may have to repeat the calibration procedure if performed incorrectly or if the user originally performs the calibration procedure in a location that has significant sources of error (e.g., large amounts of metal nearby.)

SUMMARY

The present disclosure relates to a method and system for continuous calibration of the magnetometer or compass without user involvement. In one aspect, the method can include during operation of a device, continually performing magnetometer measurements; continuously determining a state of the device; determining a magnetometer calibration model based on the magnetometer measurements and the state of the device; continually evaluating an accuracy of the magnetometer calibration model based the magnetometer measurements and the state of the device; and updating the magnetometer calibration model based on the evaluation of the accuracy magnetometer calibration model, the magnetometer measurements, and the state of the device.

In some embodiments, a method can include during operation of a device, continually performing magnetometer measurements and continuously determining a state of the device by a processor circuit. In some embodiments, the state of the device can be one of a plurality of states including an uncalibrated state indicating a calibration is not available; a two dimensional state indicating the device is experiencing planar motion; and a three dimensional state indicating the device is experiencing three dimensional motion. In some embodiments, the processor circuit can determine a magnetometer calibration model based on the magnetometer measurements and the state of the device. In some embodiments, the device can be configured to transition from one of the plurality of states to another of the plurality of states during operation and the processor circuit updates the magnetometer calibration model based on the state of the device. In some embodiment, the processor circuit can continually evaluate an accuracy of the magnetometer calibration model based on the magnetometer measurements and the state of the device and updates the magnetometer calibration model based on the evaluation of the accuracy of the magnetometer calibration model, the magnetometer measurements and the state of the device.

In some embodiments, the processor circuit can use a fitting algorithm (e.g., linear least squares fit or nonlinear least squares fit) to determine the magnetometer calibration model.

In some embodiments, the processor circuit can determine a residual root mean square ("RMS") error of the fitting algorithm to evaluate the accuracy of the magnetometer calibration model.

In some embodiments, the processor circuit can determine a geometric diversity of the measurements used by the fitting algorithm as measured by a spherical area to evaluate the accuracy of the magnetometer calibration model.

In some embodiments, the processor circuit can determine a relative difference between an estimated magnetic field strength from the magnetometer calibration model and a local earth magnetic field strength predicted by publicly available global magnetic field models (e.g., the World Magnetic Model (WMM)) to evaluate the accuracy of the magnetometer calibration model.

In one aspect, the present disclosure relates to a magnetometer calibration system. In some embodiments the system can include a magnetometer; a processor circuit coupled to the magnetometer and configured to execute instructions to perform continuous calibration of the magnetometer in a device, the calibration including: during operation of the device, continually performing magnetometer measurements; continuously determining a state of the device; determining a magnetometer calibration model based on the magnetometer measurements and the state of the device; continually evaluating an accuracy of the magnetometer calibration model based on the magnetometer measurements and the state of the device; and updating the magnetometer calibration model based on the evaluation of the accuracy magnetometer calibration model, the magnetometer measurements, and the state of the device.

DESCRIPTION

In some embodiments, the described always-on compass calibration system can continually perform magnetometer measurements and compute a calibration model for a magnetometer and the associated hard and soft iron components that are stationary with respect to the magnetometer. As noted above, these hard and soft iron components can distort the sensed magnetic field causing systematic errors in estimation of the local magnetic field and subsequently the estimation of heading-referenced attitude of a device. By determining an accurate calibration model, and consistently evaluating whether that calibration model continues to be accurate in changing conditions, the present disclosure allows for more accurate magnetometer measurements to be used by the device and other programs and components of the device. For example, the present disclosure can allow for more accurate heading measurements in a directional or "map" application on a device.

In some embodiments, the present disclosure relates to a method for determining an accurate calibration model for a magnetometer on a device. In an environment with a constant magnetic field and no hard or soft iron components, the magnetometer would measure a constant vector in 3D space. As the device is rotated, the direction of the vector will change only due to motion, and the measurements will lie on the surface of a sphere in 3D space. When hard and soft iron components are near the magnetometer, they create distortion which alters the direction of the vector in a manner inconsistent with pure motion of the device. This distortion causes the magnetometer measurement to lie on the surface of an ellipsoid in 3D space. The method uses natural motion of the device to obtain data samples collected from the magnetometer (and potentially other sensors of the device) to perform a batch model fit of this ellipsoid. Once the ellipsoid's shape is determined with sufficient accuracy, it can be inverted to remove the effects of the distortion from the magnetometer measurements such that the measurements are consistent with the true motion of the device. The error in the batch fit from this method can determine if the accuracy of the calibration model and the calibrated magnetometer samples.

Figure 1:
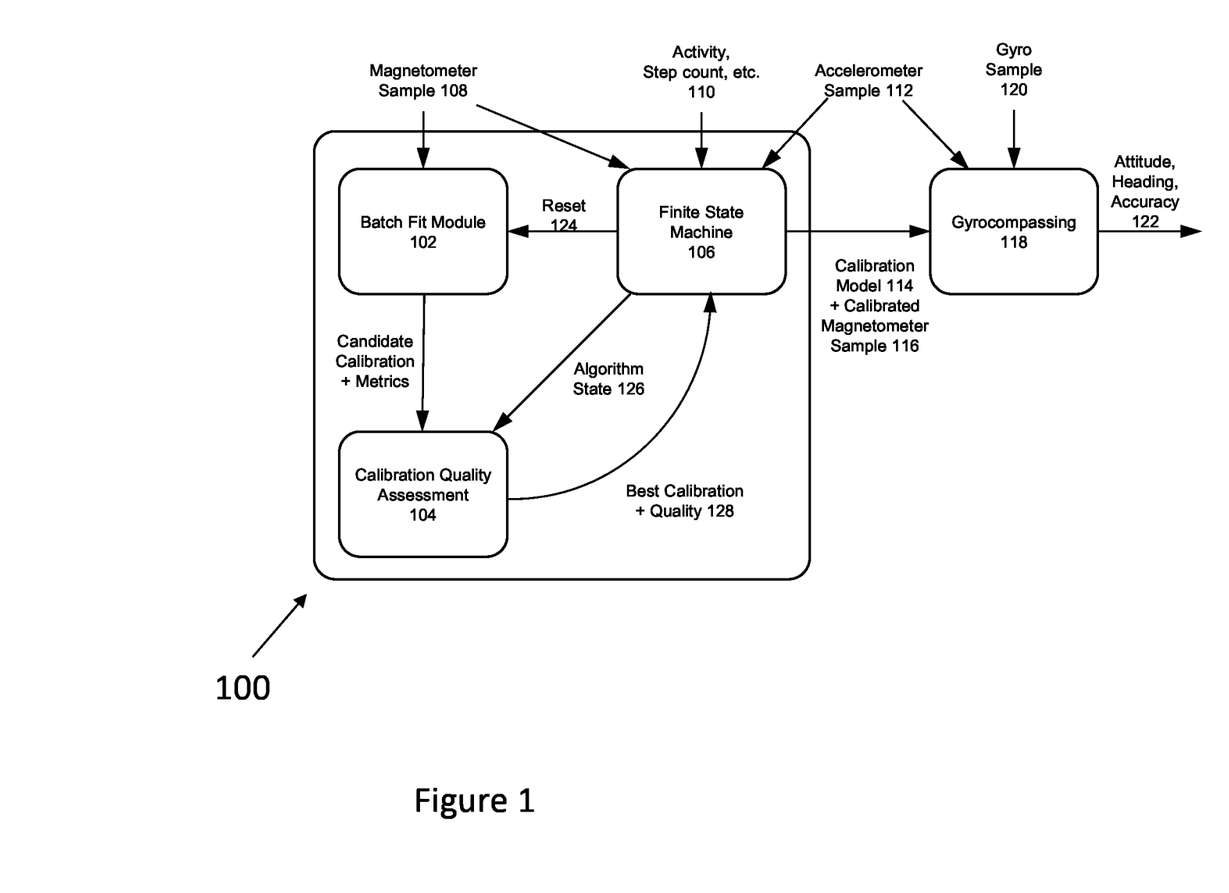
FIG. 1 is a block diagram of an always-on compass calibration system, according to some aspects of the present disclosure.

FIG. 1 is a block diagram of an always-on compass calibration system, according to some aspects of the present disclosure. The described always-on compass calibration system 100 is composed of three main components: (1) a batch fitting module 102 to compute candidate calibrations; (2) a calibration quality assessment module 104 consisting of a classifier and an algorithm to assess the quality of the generated candidate calibrations and determine the current best calibration; and (3) a finite state machine 106 to aid in the detection of changes to the inherent calibration of the device and/or environmental conditions. This calibration system can continually process magnetometer signals 108, accelerometer signals 112, and other supplementary signals 110 in real-time to provide a best estimate of the sensor calibration model for a device. Always-on compass calibration system can output one or both of a calibration model 114 and a calibrated magnetometer sample 116 to a gyrocompassing module 118. Gyrocompassing module 118 receives one or both of calibration model 114 and calibrated magnetometer sample 116 and accelerometer sample 112 and a gyro sample 120. Gyrocompassing module 118 can then output a value of attitude and heading accuracy.

As mentioned above, magnetometer can measure the local magnetic field which is a combination of the Earth's local magnetic field at the location, hard and soft iron effects caused by the local environment external to the device, and the hard and soft iron effects caused by the internal components of the device. As noted above, hard and soft iron components can affect the magnetometer sensor measurements by inducing an effective bias and ellipsoidal distortion of the local magnetic field, respectively.

Figure 2:
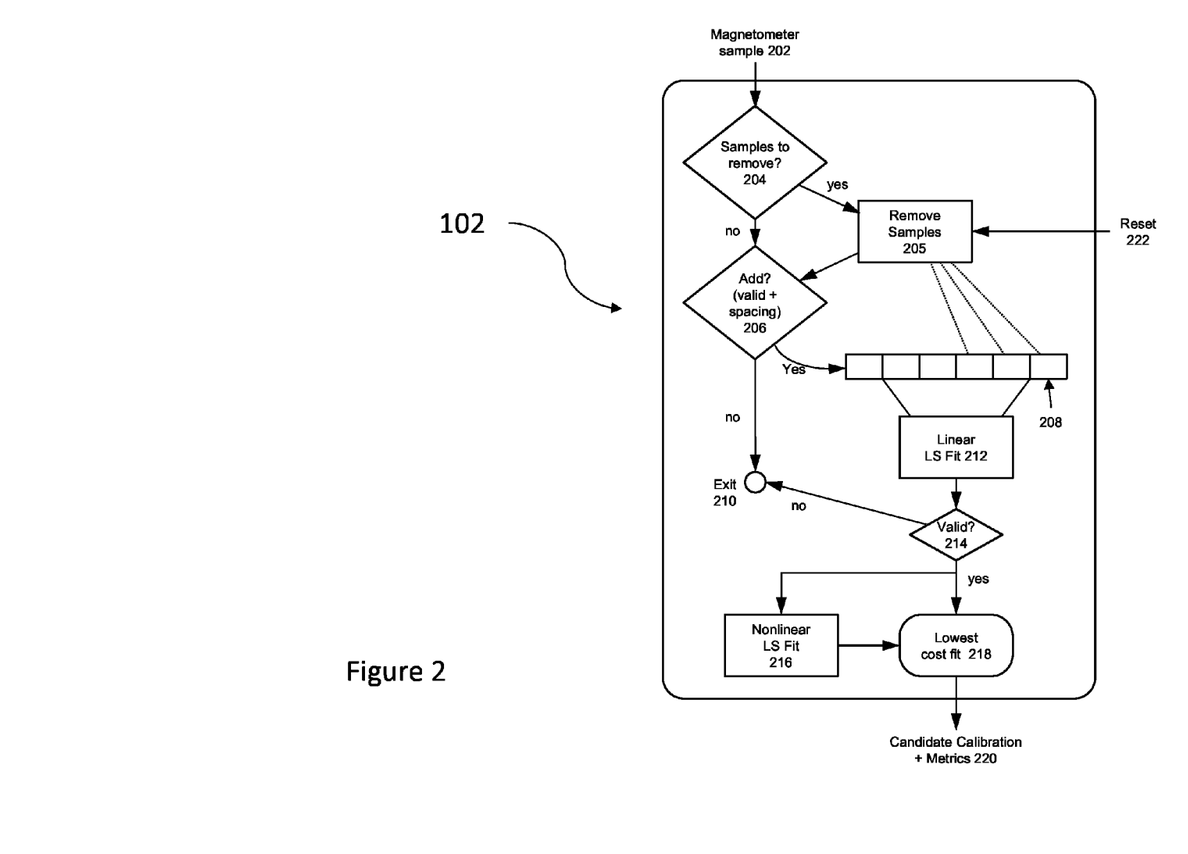
FIG. 2 is a flow chart of the batch fit process shown in FIG. 1, according to some aspects of the present disclosure.

In some embodiments, batch fitting module 102 can include a batch fitting algorithm as shown in FIG. 2. The algorithm starts with a magnetometer sample 202. Samples are continually obtained during device operation. At step 204, it is determined whether samples are to be removed. If yes, the algorithm proceeds to step 205 where samples are removed from buffer 208. If samples are not to be removed, or the samples have already been removed, the algorithm proceeds to step 206 where it is determined if samples should be added to buffer 208. Only samples with valid values and the appropriate spacings can be added to the buffer 208. If no, the algorithm stops at 210. If yes, the buffer then contains all the required samples for the algorithm to perform a linear least squares fit of the data in the buffer 208 (step 212). Step 214 determines if the fit is valid. If yes, the fit is used to initialize an additional nonlinear least squares fit, which is determined at 216. The linear and nonlinear fits are both fed to step 218 to determine which of these two candidate fits yield the lowest the residual root mean square ("RMS") error. Finally, the algorithm outputs a candidate plus metrics at step 220.

In some embodiments, a component of ensuring accuracy and stability of the batch fitting algorithm is the sampling strategy used to determine which sensor measurements should be added to the buffer, and conditions under which measurements should be removed (steps 204, 206, and 208). The sampling strategy for adding samples to the buffer includes constraints, such as validity checks (e.g. value range checks) on the individual samples, as well as enforcing a minimum geometric distance (e.g., spacing) between the buffered measurements to provide sufficient observability of the model (e.g. new samples are only added if they are some minimum distance away from existing samples in the buffer). Measurements are removed from the buffer (step 205) as the allocated space is exceeded, or the buffered measurements are sufficiently old or disparate in terms of location, to ensure the measurements are taken from the same local environment. Finally, the sample buffer has a reset mechanism 222 to flush all of the samples to recover from errors, and recover from sudden changes in environment or magnetization of the device. In some embodiments, a circular buffer can be used to constrain the memory used. A number of different LS/NLS techniques can be used, as well as other types of optimization/modeling techniques, according to aspects of the present disclosure. The output from this stage are a set of matrices describing the sensor bias and characteristic shape of field distortion, along with metrics quantifying the buffered data and the estimated calibration model, e.g., candidate calibration and metrics 220.

In some embodiments, batch fitting algorithm can use a circular buffer of 3-axis magnetometer sensor measurements to estimate the ellipsoidal model in a nonlinear least squares sense. The algorithm operates in two stages by first computing a coarse calibration model by solving for the roots of a linear matrix equation describing an elliptical surface using the buffered measurements. The solution is checked for physical consistency (i.e. the bias and distortion lie within known physical limits) before being considered a valid coarse calibration. If invalid, the solution is disregarded and the batch fitting algorithm waits for new samples in the buffer data before attempting another fit. If the coarse calibration is valid, it is used as an initial condition for the second stage of the algorithm to refine the calibration using a nonlinear least squares algorithm to minimize the geometric distance of the buffered measurements from the estimated elliptical calibration model. The output from this stage are a set of matrices describing the sensor bias and characteristic shape of field distortion, along with metrics quantifying the buffered data and the estimated calibration model, e.g., candidate calibration and metrics 220. These metrics can include the residual error of the batch fit and how well the model matches known physical constraints consistency (i.e. the bias and distortion lie within know physical limits).

In some embodiments, as the magnetometer and batch fitting algorithm run continually on the device, a method of determining the quality of the candidate calibration models can allow tradeoffs in the desired characteristics of the estimated calibration model. Example characteristics include the fidelity of the assumed calibration model (i.e. circular vs. spherical vs. ellipsoidal); sample data diversity observed by the calibration algorithm; and the similarity of the resulting estimated local field to local earth magnetic field data predicted by publicly available global magnetic field models (e.g., the World Magnetic Model (WMM)).

Figure 3:
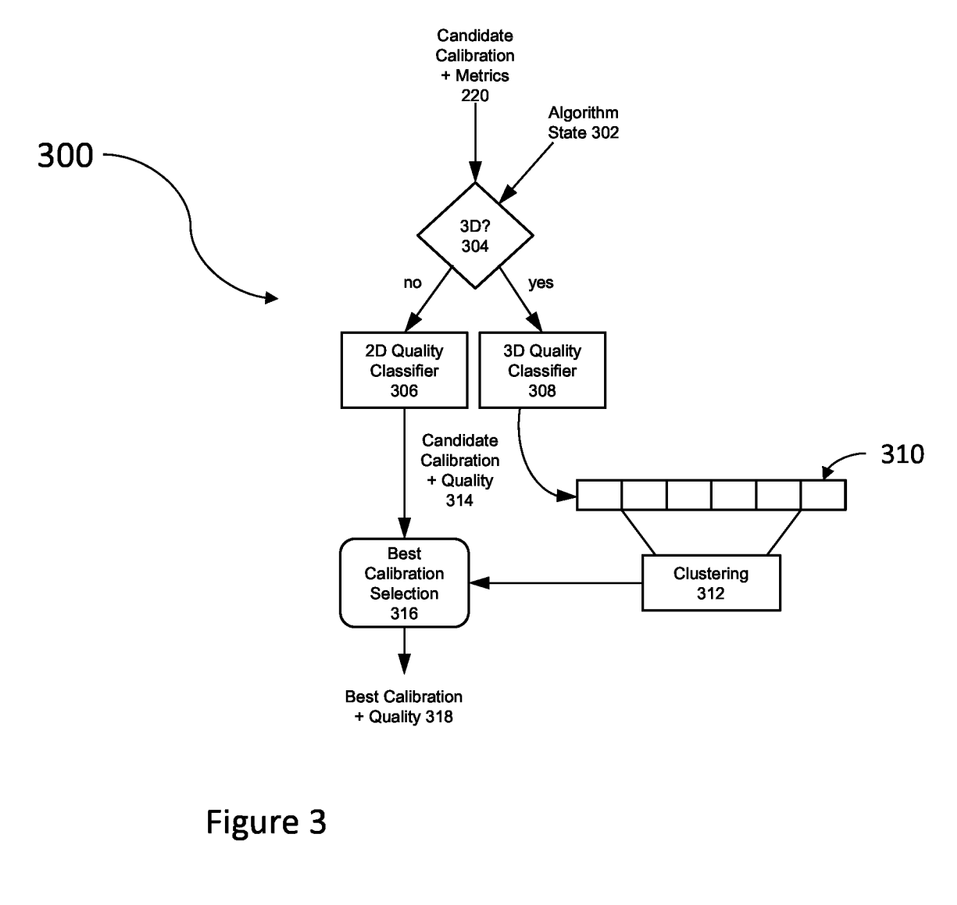
FIG. 3 is a flow chart of the calibration quality assessment process shown in FIG. 1, according to some embodiments of the present disclosure.

FIG. 3 depicts a flow chart of a quality assessment algorithm 300 contained within the quality assessment module 104. Quality assessment algorithm 300 receives as inputs candidate calibration and metrics 220 from FIG. 2 and the finite state machine state 302 (i.e. uncalibrated, 2D, or 3D). At step 304, the finite state machine state 302 determines if the candidate calibration and metrics 220 are two or three dimensional. If two dimensional, the algorithm proceeds to step 306 where a two dimensional quality classifier 306 is used. If the candidate calibration is three dimensional, the method proceeds to step 308 where a three dimensional quality classifier is used. If a three dimensional quality classifier 308 is used, it may be stored in queue 310 depending on the quality of the candidate calibration, and clustering is performed at step 312. The best calibration selection 316 is then determined and a best calibration and quality 318 is provided.

In some embodiments, quality assessment algorithm 300 relies on a classifier designed using supervised machine learning techniques to assess the quality of a candidate calibration model via three features: (1) the residual root mean square ("RMS") error of the batch fitting algorithm; (2) the geometric diversity of the measurements used by the fitting algorithm as measured by the spherical area; and (3) the relative difference between the estimated magnetic field strength from the calibration model and the predicted local earth field strength computed from the WMM.

In some embodiments, these features can constrain the classifier to associate high quality with calibration models that have low fit error, high sample data diversity, and are derived from data samples obtained in a clean magnetic environment (i.e. earth field without interference). Finally, the calibration models are periodically buffered 310 (e.g. highest quality model over a given period of time which has a quality over some minimum threshold is inserted into the buffer), and subsequently clustered in 312 as a measure of calibration consistency. Similar calibration models will be clustered together. Calibration models forming the largest cluster have the highest consistency. The current best calibration model 316 is chosen based on both quality and consistency; e.g., the best model could be the model within the largest cluster that has the highest quality; the best model could also be produced as a quality weighted average of all the models in the largest cluster. After the current best calibration model 316 is chosen, that model is used until a new best calibration model is chosen. New candidate calibration models are inserted into the consistency buffer over time. Older calibration models will be pushed out of the buffer over time. The buffer may be reset (cleared) upon certain events, e.g., a detected saturation event that is likely to cause major shift in the calibration parameters which renders all previous calibrations invalid.

In some embodiments, the calibration model can be assumed to be relatively static over time; however the hard and soft iron properties of the device can change discretely due to application of a large external magnetic field, hardware configuration changes by the user (e.g., addition/removal of a cover, external battery), or mounting/placement in a vehicle. Detection of these discrete changes allows the calibration system to respond more quickly to changes, potentially cache calibrations in known states and provide a more consistent level of performance. The methods of the present disclosure track the state of the calibration system using a finite state machine consisting of the following three states: (1) uncalibrated; (2) two dimensional (2D); and (3) three dimensional (3D).

Figure 4:
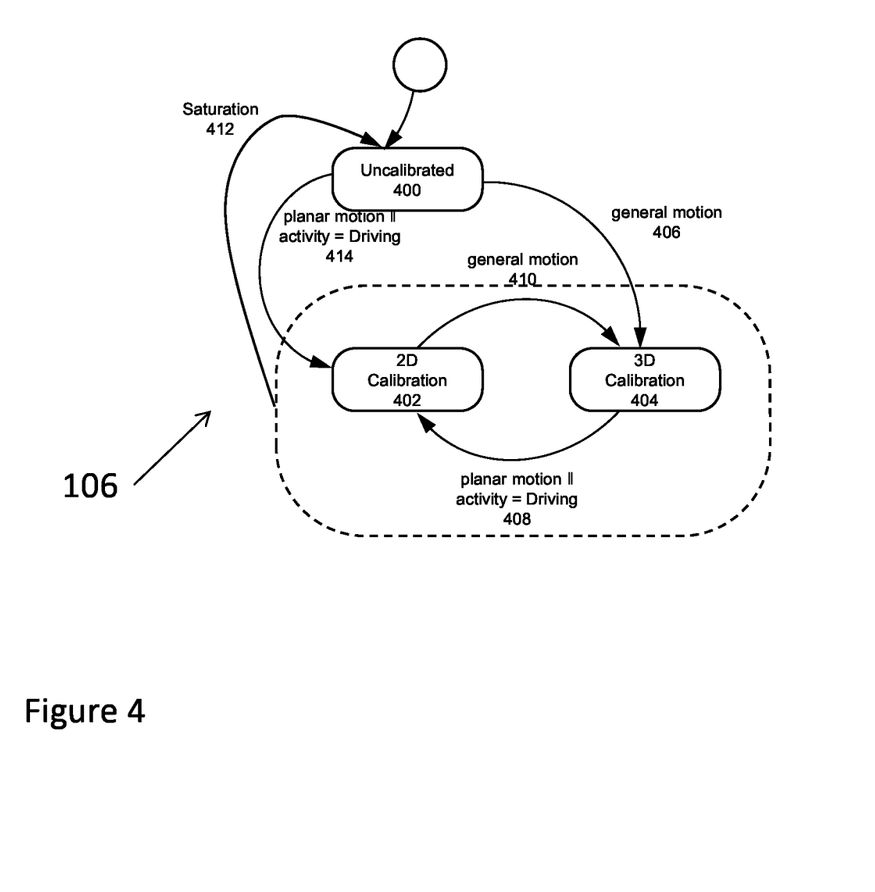
FIG. 4 is a flow chart of the finite state machine process shown in FIG. 1, according to some embodiments of the present disclosure.

FIG. 4 is a diagram of finite state machine 106, as shown in FIG. 1. Finite state machine includes the three states: uncalibrated 400, 2D calibration 402 and 3D calibration 404.

In some embodiments, the uncalibrated state can be a default initial state, and can indicate that a calibration is not available for any number of reasons, for example, due to a cold boot or changing environmental conditions without sufficient rotational motion for a new calibration. The uncalibrated state can also represent a state in which the device has been operating and has experienced an event, such as a magnetometer saturation event, that invalidates the previous calibration models.

The two dimensional state captures the notion that the device has experienced only planar rotational motion which is indicative of in-vehicle motion, i.e. when the user is either the driver or a passenger.

The three dimensional state corresponds to the device having rotational motion in full three dimensional space. The finite state machine determines the best calibration model to use for the magnetometer measurements using different metrics and/or methods parameterized by the current state. State machine 106 can move between the three states of uncalibrated 400, 2D 402 and 3D 404. For example, if the device is stationary and starts general motion 406, state machine 106 switches to 3D calibration 404. However, if after general motion is detected, the motion becomes planar, because the user is driving a car 408, the state machine 106 can switch to 2D calibration 402. If then, general motion is detected 410, the state machine 106 switches back to 3D calibration 404. Further, if the sensors become saturated 412, the state machine 106 moves out of 2D calibration 402 or 3D calibration 404 to uncalibrated 400. Finally, from an uncalibrated state 400, if planar motion is detected 414, the state machine 106 can move to 2D calibration 402.

The state transitions depend on a set of guard conditions consisting of external triggers, such as activity states, or connection to a vehicle hands-free communication link (i.e. Bluetooth), measures of how well current magnetometer measurements match the best estimated calibration model and the geometric properties of the sensor measurements. Examples of these geometric properties include the magnitude of the measured magnetic field and the planarity of the magnetometer measurements.

For example, when the device is mounted/placed in a vehicle, the resulting combined motion of the device and vehicle lie approximately in a locally horizontal plane. This planar motion is characteristic of vehicular motion, and can be detected by: (1) consistency of successive gravity estimates and (2) comparing the magnetometer measurements to a stable gravity estimate. The planar detection algorithm estimates the current gravity using accelerometer measurements. Consistency of gravity estimates are tracked by buffering the estimates and calculating their variance. Magnetometer data planarity can be detected by thresholding the mean and variance of the angle between a buffer of magnetometer measurements and the gravity estimate. This signal can be used in guard conditions of the finite state machine to decide on transitions to/from the 2D state.

In some embodiments, the resulting best calibration model from the state machine 106 can be subsequently applied to raw magnetometer samples to provide a local Earth's field estimate. In order to provide estimates, these calibrated magnetometer measurements can be algorithmically combined with accelerometer and gyro measurements to provide a smoothed estimate attitude and heading.

Figure 5:
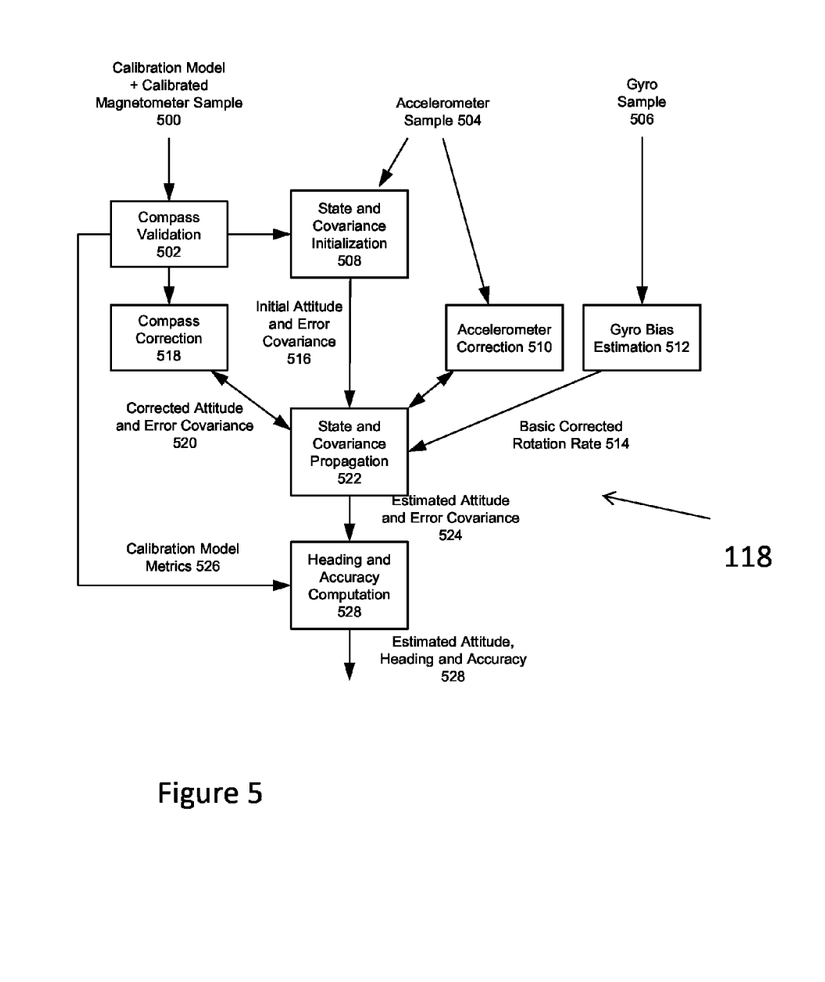
FIG. 5 is a block diagram depicting the interaction of the described calibration model with accelerometer and gyroscope samples, according to aspects of the present disclosure.

A notional implementation using an Extended Kalman Filter (EKF) is shown in FIG. 5. FIG. 5 depicts a flow chart of the method for gyrocompassing 118. The method starts with receiving a calibration mode and a calibrated magnetometer sample at step 500 into compass validation module 502. At the same time, an accelerometer sample 504 is received at state and covariance initialization module 508 and accelerometer correction module 510 and a gyro sample 506 is received at gyro estimation module 512. A base corrected rotation rate 514 is determined and is provided, along with the output of the accelerometer correction module 510, an initial attitude and error covariance 516 from state and covariance initialization module 508 and a corrected attitude and error covariance 520 from compass correction module 518, to a state and covariance propagation module 522. State and covariance propagation module 522 produces an estimated attitude and error covariance 524, which is supplied, along with calibration model metrics 526 from compass validation module 502 to heading and accuracy computation module 528. Finally, heading and accuracy computation module 528 outputs an estimate attitude and heading as well as an accuracy of that measurement 528.

In some embodiments, if the device has widely varying heading measurements but the calibration model has been determined to be high quality, the device can also look at measurements from the gyroscope to determine if the device motion matches the motion detected by the magnetometer measurements.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method for performing continuous calibration of a magnetometer in a device, the method comprising:
    during operation of the device, continually performing magnetometer measurements;
    continuously determining, by a processor circuit, a state of the device selected from a plurality of states of the device, where the plurality of states comprises:
        a two dimensional state indicating the device is experiencing planar motion; and
        a three dimensional state indicating the device is experiencing three dimensional motion;
    determining, by the processor circuit, a magnetometer calibration model based on the magnetometer measurements and the state of the device;
    continually evaluating, by the processor circuit, an accuracy of the magnetometer calibration model based on the magnetometer measurements and the state of the device;
    updating, by the processor circuit, the magnetometer calibration model based on the evaluation of the accuracy of the magnetometer calibration model, the magnetometer measurements, and the state of the device; and
    estimating an attitude or a heading of the device using the updated magnetometer calibration model.

2. The method of claim 1, where the plurality of states comprises:
    an uncalibrated state indicating a calibration is not available.

3. The method of claim 1, where the device is configured to transition from one of the plurality of states to another of the plurality of states during operation and the processor circuit updates the magnetometer calibration model based on the state of the device.

4. The method of claim 1, where the processor circuit uses a fitting algorithm to determine the magnetometer calibration model.

5. The method of claim 4, where the fitting algorithm comprises a linear least squares algorithm.

6. The method of claim 4, where the fitting algorithm comprises a nonlinear least squares algorithm.

7. The method of claim 4, where the processor circuit determines a residual root mean square ("RMS") error of the fitting algorithm to evaluate the accuracy of the magnetometer calibration model.

8. The method of claim 4, where the processor circuit determines a geometric diversity of the measurements used by the fitting algorithm as measured by a spherical area defined by the measurements data to evaluate the accuracy of the magnetometer calibration model.

9. The method of claim 1, where the processor circuit determines a relative difference between an estimated magnetic field strength from the magnetometer calibration model and a predicted local earth magnetic field strength to evaluate the accuracy of the magnetometer calibration model.

10. The method of claim 9, where the predicted local earth magnetic field strength is computed from the World Magnetic Model (WMM).

11. The method of claim 1 further comprising:
    using the estimated heading of the device to allow for more accurate heading measurements in a direction application on the device.

12. A magnetometer calibration system, comprising:
    a magnetometer;
    a processor circuit coupled to the magnetometer and configured to execute instructions to perform continuous calibration of the magnetometer in a device, the calibration comprising:
        during operation of the device, continually performing magnetometer measurements;
        continuously determining a state of the device selected from a plurality of states of the device;
        determining a magnetometer calibration model based on the magnetometer measurements and the state of the device, wherein determining the magnetometer calibration model comprises performing a batch model fit of an ellipsoid having a surface onto which the magnetometer measurements lie;
        continually evaluating an accuracy of the magnetometer calibration model based on the magnetometer measurements and the state of the device; and
        updating the magnetometer calibration model based on the evaluation of the accuracy magnetometer calibration model, the magnetometer measurements, and the state of the device; and
        estimating an attitude or a heading of the device using the updated magnetometer calibration model.

13. The system of claim 12, where the state of the device is one of a plurality of states comprising:
- an uncalibrated state indicating a calibration is not available;
- a two dimensional state indicating the device is experiencing planar motion; and
- a three dimensional state indicating the device is experiencing three dimensional motion.

14. The system of claim 13, where the device is able to transition from one state to another state during operation and the processor circuit updates the magnetometer calibration model based on the state of the device.

15. The system of claim 12, where the processor circuit uses a fitting algorithm to determine the magnetometer calibration model.

16. The system of claim 15, where the fitting algorithm comprises a linear least squares algorithm.

17. The system of claim 15, where the fitting algorithm comprises a nonlinear least squares algorithm.

18. The system of claim 15, where the processor circuit determines a residual root mean square ("RMS") error of the fitting algorithm to evaluate the accuracy of the magnetometer calibration model.

19. The system of claim 15, the processor circuit determines a geometric diversity of the measurements used by the fitting algorithm as measured by a spherical area defined by the measurements data to evaluate the accuracy of the magnetometer calibration model.

20. The system of claim 12, where the processor circuit determines a relative difference between an estimated magnetic field strength from the calibration model and a predicted local earth magnetic field strength to evaluate the accuracy of the magnetometer calibration model.

21. The system of claim 20, where the predicted local earth magnetic field strength is computed from the World Magnetic Model (WMM).

22. The system of claim 12 wherein determining the magnetometer calibration model comprises:
- determining the ellipsoid's shape with at least a predetermined accuracy, and
- inverting the ellipsoid to remove effects of distortion in the magnetometer measurements.

* * * * *